United States Patent
Benary

[11] Patent Number: 6,091,042
[45] Date of Patent: Jul. 18, 2000

[54] ARC THERMAL SPRAY GUN EXTENSION AND GAS JET MEMBER THEREFOR

[75] Inventor: Raphael Benary, East Northport, N.Y.

[73] Assignee: Sulzer Metco (US) Inc., Westbury, N.Y.

[21] Appl. No.: 09/038,425

[22] Filed: Mar. 11, 1998

[51] Int. Cl.[7] .................. C23C 4/00; B05B 7/22
[52] U.S. Cl. .................. 219/76.14; 219/76.16; 118/300; 427/449
[58] Field of Search .................. 219/76.14, 76.16, 219/121 PL, 121 PS; 239/79, 80, 81, 83; 118/300, 302

[56] References Cited

U.S. PATENT DOCUMENTS

| | | |
|---|---|---|
| 3,455,510 | 7/1969 | Rotolico . |
| 3,901,441 | 8/1975 | Kasagi . |
| 4,492,337 | 1/1985 | Harrington et al. . |
| 4,632,309 | 12/1986 | Reimer . |
| 4,668,852 | 5/1987 | Fox et al. . |
| 4,853,513 | 8/1989 | Fuimefreddo . |
| 5,191,186 | 3/1993 | Crapo et al. . |
| 5,908,670 | 6/1999 | Dunkerley et al. .......... 219/76.14 |

FOREIGN PATENT DOCUMENTS

| | | |
|---|---|---|
| 0 492 422 | 7/1992 | European Pat. Off. . |
| 2 193 464 | 2/1974 | France . |
| 26 12 616 | 9/1976 | Germany . |
| 1346054 | 2/1974 | United Kingdom . |
| 91/12183 | 8/1991 | WIPO . |

*Primary Examiner*—Shrive Beck
*Assistant Examiner*—Parviz Hassanzadeh
*Attorney, Agent, or Firm*—Chadbourne & Parke LLP

[57] ABSTRACT

An arc spray apparatus includes a spray gun body with a pair of converging wire guides to guide two feeding metal wires to a region of contact at the wire tips where an arc melts the tips. A gas jet member has a projection extending forwardly from the gun body and offset laterally from a guide plane defined by the axes of the wire guides. The projection has a primary orifice to issue a primary gas jet directed laterally to the point of contact for atomization of the molten metal and production of a spray stream at an angle to the guide plane, preferably perpendicular. A plurality of at least four secondary orifices are arcuately spaced about the primary orifice. The secondary orifices effect secondary gas jets substantially parallel to the primary jet, so that the spray stream is constricted by the secondary gas jets.

12 Claims, 4 Drawing Sheets

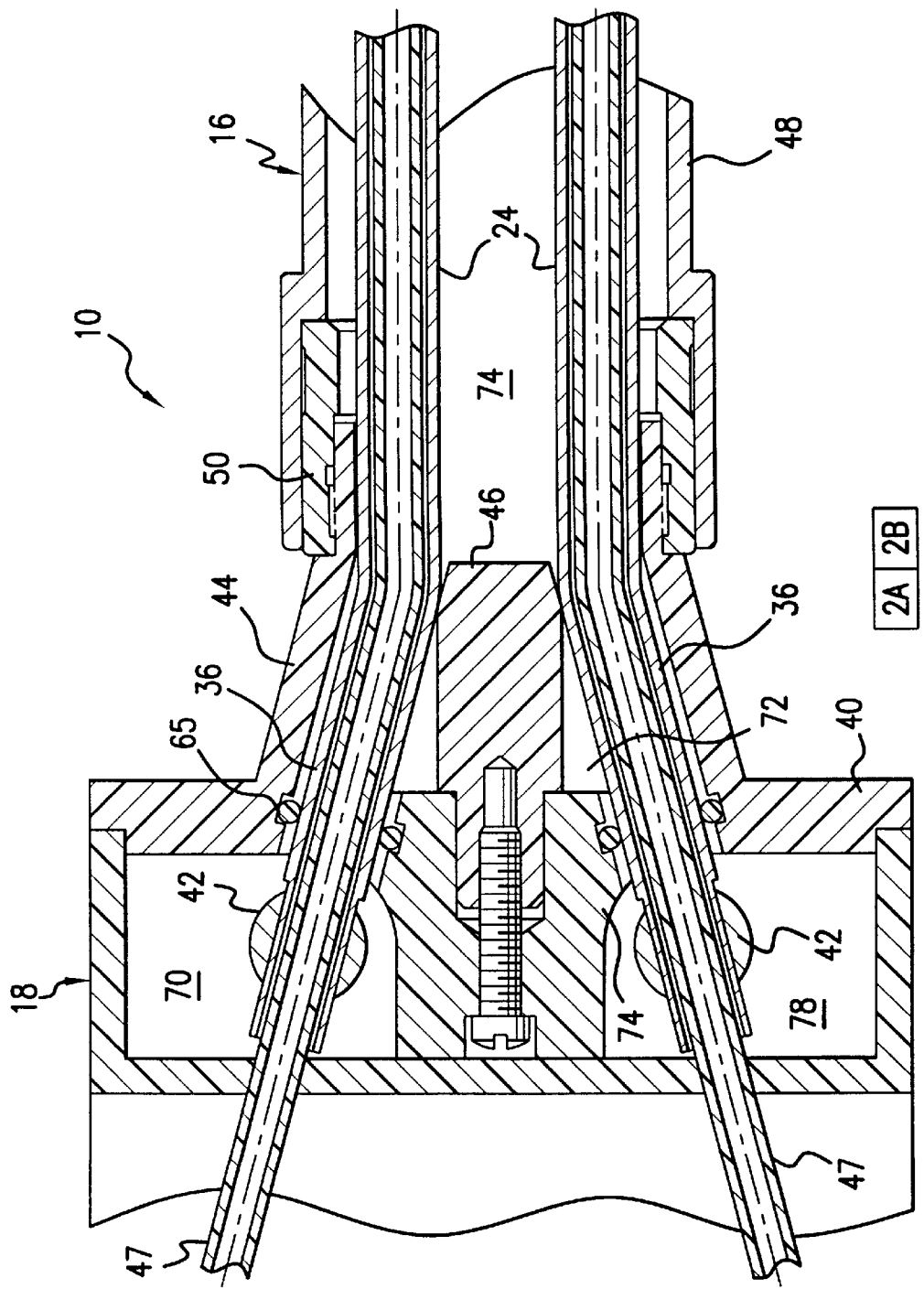

ARC THERMAL SPRAY GUN EXTENSION AND GAS JET MEMBER THEREFOR

This invention relates to thermal spray apparatus and articularly to a dual wire, arc type of thermal spray gun.

BACKGROUND

Thermal spraying is a process of melting and propelling fine particles of molten material such as metal to form a coating. One type of thermal spray gun that has been in use for more than 30 years is a dual wire, arc thermal spray gun, in which two wires are fed into contact at the wire ends that are melted by an electrical arc with current passed through the wires. A jet of compressed gas (usually air) is blown through the tips to atomize (i.e. nebulize) the molten metal and effect a spray stream of molten metal particles. Arc current generally is of the order of hundreds of amperes.

Some applications involve coating inside surfaces of holes or other confined areas such as cylinder bores. For such applications an extension gun is used in which a gas jet from the side deflects the spray from the main axis so that the gun can be inserted into the hole with the angled or deflected spray directed to the surface. The side jet may also act as the primary atomizing jet or be an auxiliary jet to a central atomizing jet. Generally the deflection jet causes a spreading of the spray stream, particularly when such a jet both atomizes and deflects. It is generally known in the art that spreading of the spray stream can result in cooling fringe particles that reduce coating quality, and there has long been a need to reduce this spreading and provide a more constricted spray stream.

Accordingly, an object of the invention is to provide an improved, dual wire, extension type of arc thermal spray apparatus for effecting a narrowed spray stream at an angle to the main axis of the apparatus. Another object is to provide such an apparatus for improving coating quality in confined areas. Yet another object is to provide such an apparatus for improved coating quality without significantly interfering with the arc or atomization for the spray stream. A further object is to provide a novel gas jet member for such an apparatus in order to achieve the foregoing objects.

SUMMARY

The foregoing and other objects are achieved, at least in part, in an arc spray apparatus that includes a spray gun body, a pair of tubular wire guides held convergingly by the gun body so as to guide two metal wires to a point of contact at tips of the wires, a wire feeding mechanism operatively connected to feed the wires is respectively through the wire guides, and a gas jet member extending from the gun body. The wire guides have guide axes defining a guide plane containing the point of contact, and the wires are receptive of an arc current to effect an arc and thereby molten metal at the wire tips. The jet member comprises a projection extending forwardly from the gun body, the projection being offset laterally from the guide plane. The projection has a primary orifice therein receptive of compressed gas to issue a primary gas jet directed laterally to the point of contact for atomization of the molten metal and production of a spray stream thereof at an angle to the guide plane substantially greater than zero, preferably perpendicular to the plane. The jet member further has a plurality of at least four secondary orifices arcuately spaced about the primary orifice. The secondary orifices are receptive of compressed gas to effect secondary gas jets substantially parallel to the primary jet, whereby the spray stream is constricted by the secondary gas jets.

Objects are also achieved with a gas jet member adapted to fit to a gun body of the above-described arc thermal spray apparatus. The jet member has a primary orifice and a plurality of secondary orifices as in the above-described jet member.

BRIEF DESCRIPTION OF THE DRAWINGS

FIG. 2A is a longitudinal section of a rear portion of the thermal spray gun of FIG. 1.

DETAILED DESCRIPTION

Figure 1:
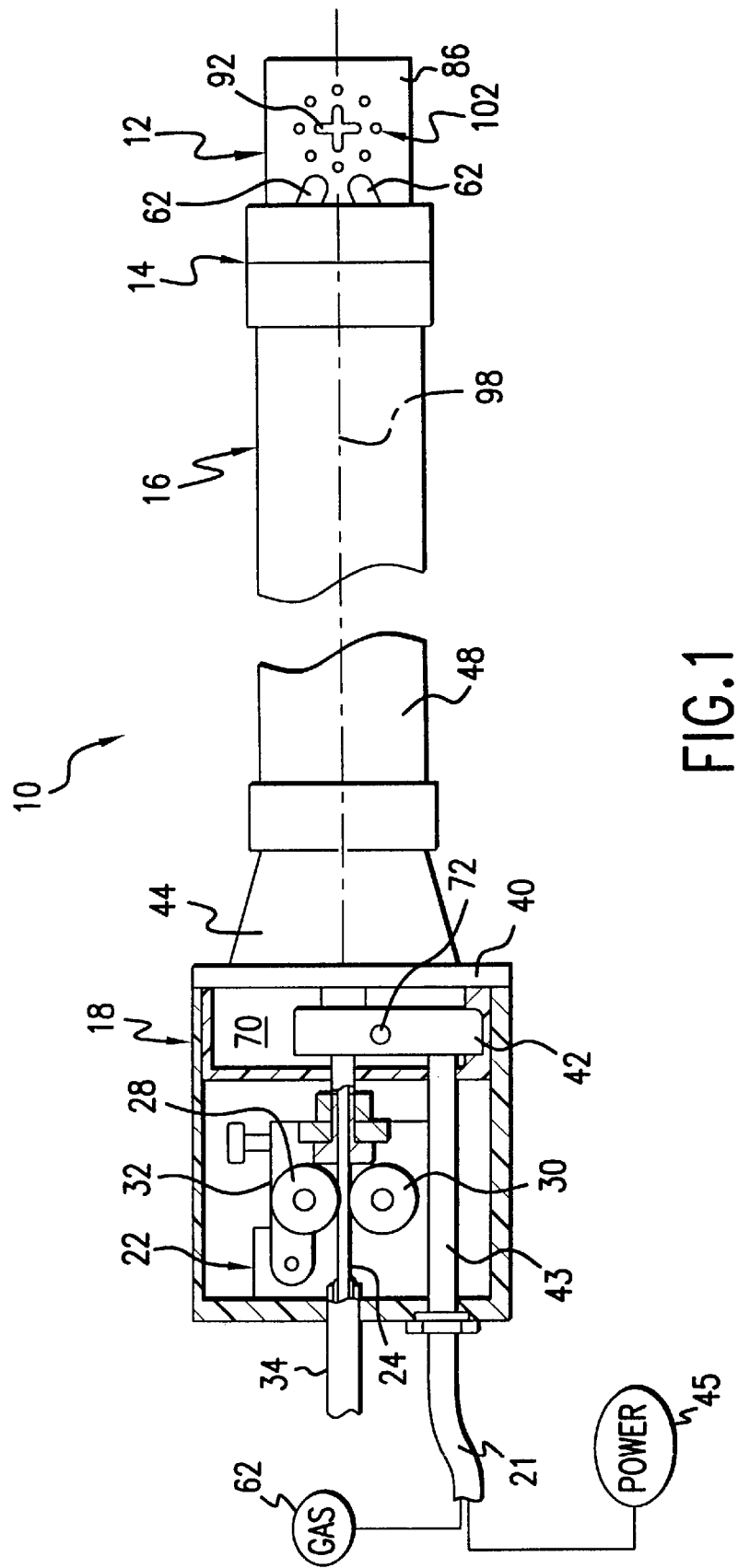
FIG. 1 is a longitudinal view, partially in section, of an arc wire thermal spray gun incorporating the invention, with the right portion rotated 900 on the gun axis.

A dual wire, arc thermal spray gun 10 incorporating the invention may be a conventional or other desired type except with respect to a gas jet member 12 described herein. In the present example, a gun body has three portions, namely a forward gun body 14, an elongated middle gun body 16 and a rear gun body 18. The rear body separates gas and power from a pair of hose cables 21, and also contains a wire drive mechanism 22. The front gun body brings the wires together for arcing and has the gas jet member 12 for atomizing, deflecting and constricting a spray stream from the molten wire tips. The middle gun body is an extender that links the front and rear gun bodies. A console (not shown) typically contains a rectifier a gas regulator and supports for wire reels, to supply power, wire and gas to the gun.

(As used herein and in the claims, the terms "forward" and "front" are with reference to the direction in which the wires are driven, and "rear" and "rearward" denote the opposite direction. The terms "inner" and "inward" mean facing or directed toward the gun axis.)

Figure 2B:
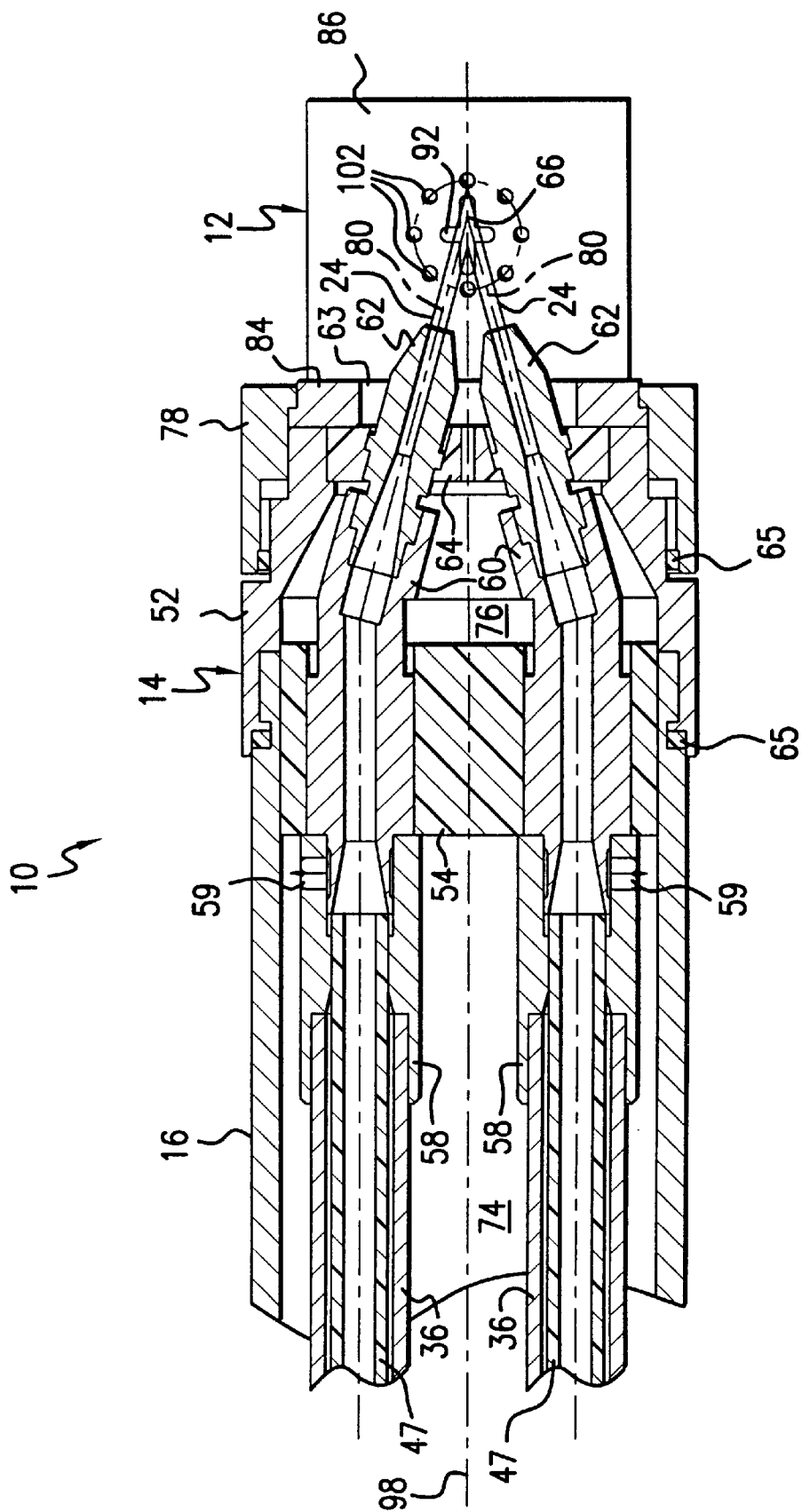
FIG. 2B is a longitudinal section of a forward portion of the thermal spray gun of FIG. 1.

In the present example, the rear gun body 18 contains the wire drive mechanism 22 (FIG. 1). Such a wire drive may utilize a small, variable speed electric motor (not shown) driving gears connected to electrically insulated feed rollers 30, with roller tension maintained for each wire with a spring tension device 32 urging insulated idler rolls located above the feed rollers. Wires 24 leading through flexible tubing 34 from spools or wire containers (not shown) are thereby fed by the rollers through and into wire tubes 36 (FIG. 2A). The type or location of the wire drive is not important to this invention, and any other suitable conventional or other desired mechanism may be used. A push drive at the reels may be used to replace or supplement the wire drive in the gun.

A support block 40 forward of the drive mechanism contains vertical contact posts 42, the bases of which are attached to rigid tubes 43 connecting from the power cables 21 which, in turn, are connected to a conventional source of electrical power 45 for effecting an arc. The conductive wire tubes 36 are secured for support and electrical contact in diametric holes in the posts. These tubes angle inwardly in a tapered section 44 of the support block, and then straighten out to extend in parallel along the middle gun body 16. The tubes are supported in the tapered section by a centering post 46.

The wire tubes 36, containing tube liners 47, preferably formed of a low friction material such as plastic imbedded with PTFE or $MoS_2$, extend from just forward of the drive rolls 30. The liners enter the tubes rearwardly of the vertical posts 42 and continue inside the tubes in the middle gun body. The middle gun body has an elongated, cylindrical extension housing 48 with an end fitting 50 at the rear fastened to the forward end of the taper section. The middle gun body has a selected length for a particular application depending on depth of hole or other confined area to be sprayed, for example 30 cm or 60 cm.

Figure 3:
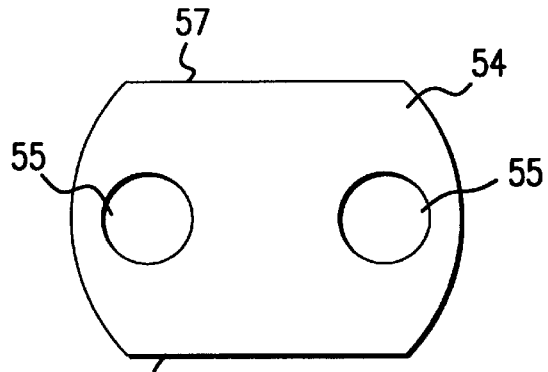
FIG. 3 is a front view of a support member shown in FIG. 2B.

The forward gun body 14 (FIG. 2B) is generally cylindrical and includes a front member 52 threaded to the extension housing. A support member 54 affixed in the front body has a pair of through holes 55 (FIG. 3) and is truncated on opposite sides 57 for air flow (explained below). The support member holds a pair of angular guides 60 that extend forwardly from these fittings through the support member 54, and then bend inwardly. These guides (and the holes 55) may have a rectangular cross section for manufacturing convenience. A pair of termination fittings 58 are affixed with pins 59 to the guides 60 rearwardly thereof for connecting to the forward ends of the wire tubes 36 and the tube liners 47.

Conductive wire guides 62 are threaded into the converging forward ends of the angular guides. The wire guides are positioned through respective holes 63 in a support disk 64 (FIG. 4) that is retained in the front member 52. These tubes contact the wires electrically to provide the electrical current through the wires, and converge the wires to a region of contact 66 of the wires. With a conventional source of arc power (typically DC) applied through the wires, an electric arc will be formed, thus melting the wire ends. Power is supplied from its line source via a rectifier in the console and hence through the cables 21, the wire tubes 36 and the wire guides 62 to the wires.

All components are held together conventionally, as partially illustrated, by screws, threading, epoxy, press fitting, or the like. At least the rear gun body may have a removable cover for access to the drive mechanism. Appropriate parts are formed of electrical insulating material, such as a hard plastic, including the tapered section in the rear gun body and the supports in the forward gun body. O-ring seals 65 are used strategically.

Atomizing air or other gas from a primary source 62 (FIG. 1) of compressed gas is brought through the cable hoses 21 and the rigid tube 43 to the bases of the support posts 42 (along with the power). Lateral holes 72 in the posts feed the air into a chamber 70 in the block 40. Four holes (not shown) in a forward wall 74 of the block lead the air to a second chamber 72 (FIG. 2A) in the taper section 44 and thence through a duct 74 formed by the housing 48 of the middle gun body. The air flows past the truncated support member 54 to a forward chamber 76. A small portion of the air flows through an axial hole 77 (e.g. 8 mm diameter) in the support disk to blow away extraneous spray material and minimize buildup on the forward surfaces of the gun.

The structural details of the foregoing aspects of the arc gun apparatus, for the purposes of the present invention, are not important and need not be limited to the present example. Other configurations may be used. For example, the extension housing 48 may be omitted and, in place, rigid tubes used for conveying the wires, power and gas and providing support between the rear and forward gun bodies, as taught in U.S. Pat. No. 4,853,513, the portions thereof relevant to such conveyance and support being incorporated herein by reference. The rigid tubes (or other configuration such as with a housing) may be curved as taught in that patent, or may be straight.

Similarly, details of physical connections for the housing and tubes are not important. The type of electrical contact to the wires is also not important to the present invention, and any other conventional or desired contact means such as rollers may be used. For example, electrical contact may be effected remotely from the gun such as at the mounting for reels of the wires. Broadly, what is generally needed is a connection of power to the wires, reception by the gun of the two wires, gas and power (unless the latter is conducted to the wires rearwardly), a wire drive mechanism (that may be in anywhere in the wire train), a front gun body to bring the wires into the region of contact for arcing, an extension support for the front gun body, and a gas supply to the front gun body.

Figure 4:
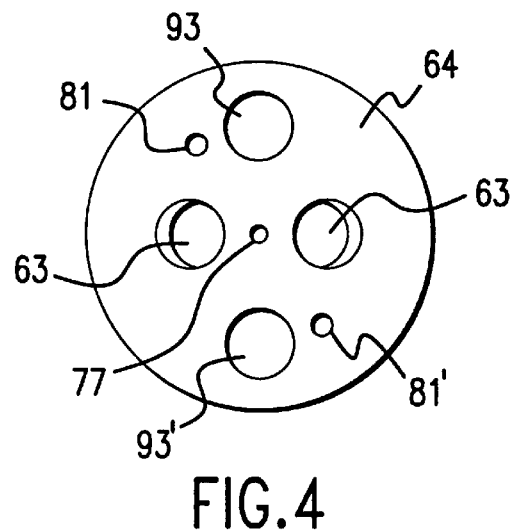
FIG. 4 is a rear view of a support disk shown in FIG. 2B.
Figure 5:
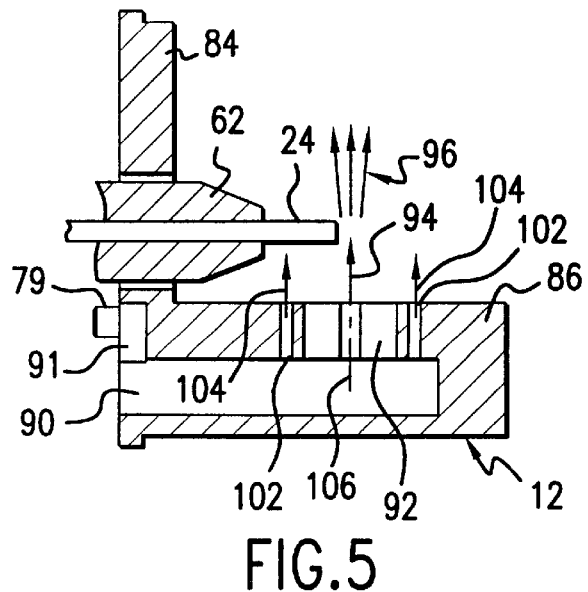
FIG. 5 is a side view of a gas jet member component of the thermal spray gun of FIG. 1.

The gas jet member 12 (FIGS. 2B and 5) is attached with a retaining ring 78 (or other suitable fastening system such as screws, detents or threading of the member) to the front end of the forward gun body. An offset pin 79 advantageously is used to orient the member in a corresponding hole 81 in the support disk 64 (FIG. 4). (A second hole 81' is provided to allow optional 180° orientation of the jet member.) To help define the gas jet member, the wire guides 62 have guide axes 80 defining a guide plane containing the region of contact 66. The jet member has a base 84 and a projection 86 extending forwardly from the base, the projection being offset laterally from the guide plane. The inwardly facing surface 88 of the projection should be proximate the region of contact of the wires but spaced sufficiently therefrom so as not to be damaged by the arc.

The projection has a manifold chamber 90 therein, the chamber having a connecting hole 91 to an corresponding hole 93 in the forward support disk 64 to receive the compressed air from the chamber 76 in the front gun body. (A second disk hole 93' accommodates the optional 180° orientation.) The projection further has a cross-shaped primary orifice 92 therein that connects to the manifold chamber so as to be receptive of the compressed air (or other gas). The primary orifice aims toward the region of contact of the wires so that a primary gas jet 94 is directed laterally to atomize the molten metal and produce a spray stream 96 thereof. The gas jet is directed at an angle to the guide plane substantially greater than zero (generally at least 70°) and preferably substantially perpendicular to the guide plane to produce the spray stream perpendicular to the main axis 98 of the gun apparatus to allow optimal spraying onto a side wall of a hole. The orifice has a conventional or other desired cross section, for example a round hole or a shape such as a cross (as shown) or a C-shape as shown in international patent application, international publication No. WO 91/12183. Instead of a single shaped orifice, a second orifice, or more such orifices, may be disposed next to the primary orifice and directed to the region of contact for the purpose of aiding in the atomizing and deflecting of the spray.

The projection additionally has a plurality of at least four secondary orifices 102 arcuately spaced about the primary orifice 92 and nominally parallel thereto. There should be as many secondary orifices as practical, generally between 4 and 16, for example eight orifices as shown. These orifices conveniently lead from the manifold chamber 90, but alternatively may be connected to a separately regulated source of compressed air to effect secondary gas jets 104. The spray stream 96 is constricted by the secondary gas jets to reduce overspray. These secondary orifices are not aimed at the contact point and are spaced from the primary orifice so as not to significantly interfere with the arc or atomization by the primary jet. Otherwise, the secondary orifices should be sufficiently close to the primary orifice to effect the narrowing of the spray stream.

The secondary orifices preferably are equidistant radially from the axis 106 of the primary orifice, but alternatively may have slightly different distances, for example staggered at different distances to allow more holes, or the orifices may be arranged in a flattened ring to effect a constriction on two sides for a fanning of the spray stream. The arcuate spacing of the holes preferably is equal but need not be; for example it may be desirable to omit the one or three holes nearest the base 84 to reduce any interference with the arc and atomization. Also, the term "nominally parallel" means that the secondary orifices may vary from being strictly parallel to the primary orifice by as much as about 30°. Preferably, however, the secondary orifices are substantially parallel to the primary orifice, i.e. within about 10° to achieve narrowing of the spray stream without significant interference.

The secondary orifices 102 may be formed simply as drilled holes in the projection as shown, or may be formed in a set of nozzle inserts fitted into such holes, or by a ring of pipes. However, it generally should be sufficient to provide the orifices as simple holes. The orifices should be of such size that, under high pressure from the source 88 of compressed gas, choked flows with high velocity are effected toward the spray stream. The orifices should be configured with a high aspect ratio of length to diameter to effect high jet velocity, the aspect ratio preferably being at least 4:1. The secondary orifice diameters should generally be between about 0.5 mm and 2 mm, for example 1.6 mm. The compressed air source 88 should be regulated to provide an effective jet flow for a desired degree of constricting and narrowing or the spray stream. In the present example the secondary orifices are eight parallel 1.6 mm diameter holes with 6.5 mm length on a bolt circle of 13 mm on the axis of the primary orifice. Spraying is otherwise conventional. For example, stainless steel wire (Sulzer Metco Metcoloy™ #2) of 1.6 mm diameter was sprayed using 250 amperes, 3.3 bar (50 psi) air pressure, and a spraying rate of about 9 kg/hr.

A gas jet member of the invention may be used in other styles of two wire arc guns and different types of head members. In one embodiment, the jet member comprises a simple projection extending from and formed integrally with the gun body. In other embodiments, gas jet members according to the present invention, having the afore-described primary and secondary orifices, may be fitted to variously configured guns with appropriate adaptation.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. In an arc spray extension apparatus comprising a spray gun body, a pair of tubular wire guides held convergingly by the gun body so as to guide two metal wires to a region of contact at tips of the wires, a wire feeding mechanism operatively connected to feed the wires respectively through the wire guides, and a gas jet member attached to the gun body, the wire guides having guide axes defining a guide plane, and the wires being receptive of an arc current to effect an arc and thereby molten metal at the wire tips, wherein the jet member comprises a projection extending forwardly from the gun body, the projection being offset laterally from the guide plane and having a primary orifice therein receptive of compressed gas to issue a primary gas jet directed laterally to the region of contact for atomization of the molten metal and production of a spray stream thereof at an angle to the guide plane substantially greater than zero; the improvement comprising the primary orifice having a cross-shaped and the projection further having a plurality of at least four secondary orifices arcuately spaced about the cross-shaped primary orifice, the secondary orifices being receptive of compressed gas to effect secondary gas jets nominally parallel to the primary jet, whereby the spray stream is constricted by the secondary gas jets.

2. The apparatus of claim 1 wherein the plurality is between 4 and 16 inclusively.

3. The apparatus of claim 1 wherein the orifices have an aspect ratio of length to diameter of at least 4:1.

4. The apparatus of claim 1 wherein the projection has a manifold chamber therein communicating with the primary orifice and the secondary orifices, the chamber being receptive of the compressed gas by way of the gun body.

5. The apparatus of claim 1 wherein the primary gas jet and the secondary gas jets are directed substantially perpendicular to the guide plane.

6. The apparatus of claim 1 wherein the secondary gas jets are substantially parallel to the primary jet.

7. A gas jet member for producing an angled spray stream from an arc spray extension apparatus, the apparatus including a spray gun body, a pair of tubular wire guides held convergingly by the gun body so as to guide two metal wires to a region of contact at tips of the wires, and a wire feeding mechanism operatively connected to feed the wires respectively through the wire guides, the wire guides having guide axes defining a guide plane, and the wires being receptive of an arc current to effect an arc and thereby molten metal at the wire tips; wherein:

the jet member comprises a base and a projection therefrom, the base being adapted to fit the jet member to the gun body with the projection being offset laterally from the guide plane, the projection having a cross-shaped primary orifice therein receptive of compressed gas to issue a primary gas jet directed to the region of contact for atomization of the molten metal and production of a spray stream thereof at an angle to the guide plane substantially greater than zero, and further having a plurality of at least four secondary orifices arcuately spaced about the cross-shaped primary orifice, the secondary orifices being receptive of compressed gas to effect secondary gas jets nominally parallel to the primary jet, whereby the spray stream is constricted by the secondary gas jets.

8. The gas jet member of claim 7 wherein the plurality is between 4 and 16 inclusively.

9. The gas jet member of claim 7 wherein the orifices have an aspect ratio of length to diameter of at least 4:1.

10. The gas jet member of claim 7 wherein the projection has a manifold chamber therein communicating with the primary orifice and the secondary orifices, the chamber being receptive of the compressed gas by way of the gun body.

11. The gas jet member of claim 7 wherein the primary gas jet and the secondary gas jets are directed substantially perpendicular to the guide plane.

12. The gas jet member of claim 7 wherein the secondary gas jets are substantially parallel to the primary jet.

* * * * *